Dec. 29, 1931.    J. C. WARNER    1,839,067
RELAY SYSTEM
Filed April 17, 1928
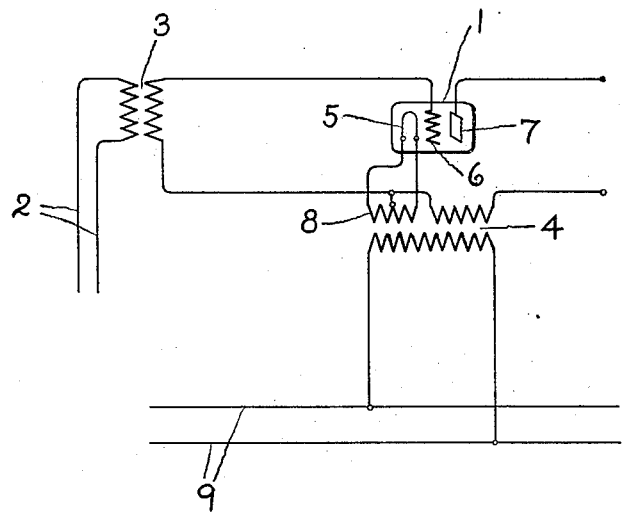
Inventor:
John C. Warner,
by Charles E. Tullar
His Attorney Patented Dec. 29, 1931

1,839,067

UNITED STATES PATENT OFFICE

JOHN C. WARNER, OF SCHENECTADY, NEW YORK, ASSIGNOR TO GENERAL ELECTRIC COMPANY, A CORPORATION OF NEW YORK

RELAY SYSTEM

Application filed April 17, 1928. Serial No. 270,740.

My invention relates to relay systems including a space discharge device provided with input and output circuits, and has for its principal object the provision of an improved relay system and method of operation whereby variations in the electrical conditions of an alternating current circuit connected to the input circuit of the device may be utilized to regulate the direct current output of the device.

It is frequently desirable to operate a space discharge device by power supplied from an alternating current circuit and to regulate the direct current output of such a device in accordance with an electrical condition of the alternating current circuit. In accordance with my invention, these results are produced by means of an improved relay system wherein a predetermined phase relation is maintained between the voltages applied to the input and output circuits of the device and wherein the voltage of the input circuit is preferably applied through a high ratio transformer or a transformer having a secondary winding of comparatively high impedance.

My invention will be better understood from the following description when considered in connection with the accompanying drawing and its scope will be pointed out in the appended claims.

The drawing is a wiring diagram of a relay system wherein my invention has been embodied.

This system comprises a space discharge device 1 which is provided with an input circuit connected to an alternating current source 2 through a high ratio transformer 3 and with an output circuit connected to a source 9 through a transformer 4. As will be readily understood by those skilled in the art the input circuit of the device 1 includes a cathode 5 and a grid 6; the output circuit includes the cathode 5 and a plate or anode 7; and heating current is supplied to the cathode 5 through a secondary winding 8 of the transformer 4.

In the operation of the system it is desirable that the transformers 3 and 4 be so arranged that the grid voltage is positive with respect to the cathode when the anode voltage is negative. This phase relation between the grid and anode voltages is advantageous for the reason that the voltage of the grid is comparatively low during the half cycle when the grid is positive and is comparatively high during the half cycle when the grid is negative. This difference in the magnitudes of the positive and negative values of the grid voltage is due to the electron current flowing through the high impedance of the grid transformer when the grid is positive. It has the advantage that substantially no current is transmitted through the input circuit when the grid is negative and the full value of the voltage induced in the input circuit is effective to regulate the current of the output circuit during the half cycle when the anode is positive and current is transmitted through this circuit.

In this circuit arrangement, the device 1 is supplied with power from the alternating current circuit or source 9 and as hereinbefore pointed out, the circuit arrangement is such that the direct current output of the device is controlled in accordance with an electrical condition of an alternating current circuit which in the present example is circuit 2. This may be of variable voltage amplitude to effect a variation in the rectified current flowing in the output circuit but is of the same frequency as the plate voltage supply for the reason that the phase relation above mentioned must be maintained, i. e., the frequency of sources 2 and 5 must be the same. The input circuit of device 1 is therefore supplied with alternating voltage of the same frequency as, but 180 degrees out of phase with, that of the anode circuit and of variable magnitude.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:—

1. The combination of a space discharge device including a grid for controlling the current transmitted between its cathode and anode, means for applying an alternating potential to said anode, means for applying to said grid an alternating potential of the same frequency as the anode supply and of variable magnitude, which potential is positive when the potential of said anode is negative, and means for causing the potential of said grid to be comparatively high during the negative half cycle of the voltage applied to said grid and to be comparatively low during the positive half cycle of the voltage applied to said grid.

2. In a relay apparatus, the combination of a space discharge device having an anode, a cathode, and a control grid, an input circuit connected with grid, an output circuit connected with the anode for receiving the direct current output therefrom, a source of alternating current, means for supplying alternating current from said source to the anode, a high impedance step-up transformer having a secondary winding connected with the input circuit, and a source of alternating voltage of the same frequency and opposite polarity from that of the first-named source and of variable magnitude connected with the primary of said transformer, whereby the direct current output of the device is controlled by the alternating voltage of the second-named source.

In witness whereof, I have hereunto set my hand this 16th day of April, 1928.

JOHN C. WARNER.